United States Patent
Pl et al.

(10) Patent No.: US 12,531,742 B2
(45) Date of Patent: Jan. 20, 2026

(54) METHOD AND SYSTEM FOR SECURE PASSWORD MIGRATION BETWEEN AUTHENTICATION SERVERS

(71) Applicant: JPMorgan Chase Bank, N.A., New York, NY (US)

(72) Inventors: Nikesh Pl, Bengaluru (IN); Vipin Sihare, Bengaluru (IN); Pavan Kumar, Bangalore (IN)

(73) Assignee: JPMORGAN CHASE BANK, N.A., New York, NY (US)

(*) Notice: Subject to any disclaimer, the term of this patent is extended or adjusted under 35 U.S.C. 154(b) by 2 days.

(21) Appl. No.: 18/802,307

(22) Filed: Aug. 13, 2024

(65) Prior Publication Data

US 2026/0005860 A1  Jan. 1, 2026

(30) Foreign Application Priority Data

Jun. 27, 2024  (IN) .............................. 202411049256

(51) Int. Cl.
*H04L 9/32* (2006.01)
*H04L 9/08* (2006.01)

(52) U.S. Cl.
CPC .......... *H04L 9/3226* (2013.01); *H04L 9/0869* (2013.01); *H04L 9/3213* (2013.01)

(58) Field of Classification Search
CPC .... H04L 9/3226; H04L 9/0869; H04L 9/3213
See application file for complete search history.

(56) References Cited

U.S. PATENT DOCUMENTS

| | | | | |
|---|---|---|---|---|
| 9,094,207 | B2* | 7/2015 | Attia | H04W 12/06 |
| 10,129,028 | B2* | 11/2018 | Kamakari | H04L 9/3073 |
| 11,741,461 | B2* | 8/2023 | Ahn | G06Q 20/3829 |
| | | | | 705/71 |
| 12,335,253 | B2* | 6/2025 | Gomi | H04L 9/3231 |
| 2015/0222619 | A1* | 8/2015 | Hughes | H04L 9/0852 |
| | | | | 713/168 |
| 2018/0062863 | A1* | 3/2018 | Baskaran | H04L 63/067 |
| 2020/0014538 | A1* | 1/2020 | Liu | H04L 9/3231 |
| 2020/0169406 | A1* | 5/2020 | Liu | H04L 9/30 |
| 2020/0274721 | A1* | 8/2020 | Melo | H04L 9/3265 |
| 2023/0198767 | A1* | 6/2023 | Nagandla | H04L 9/3239 |
| | | | | 713/159 |
| 2024/0097909 | A1* | 3/2024 | Reilly | H04L 9/0825 |

* cited by examiner

*Primary Examiner* — Stephen T Gundry
(74) *Attorney, Agent, or Firm* — GREENBLUM & BERNSTEIN, P.L.C.

(57) ABSTRACT

A method and a system for securely performing a password migration between authentication servers where the password is end-to-end encrypted and hashed are provided. The method includes: after the user has received first and second public keys from the first and second servers, and after the user has stored, in a memory, first and second encrypted versions of the password that are respectively encrypted by using the first and second public keys, transmitting a request to perform an authentication with the first server based on the first encrypted version of the password; after a validated token has been issued by the first server, receiving a request to update the password in the second server based on the token, and transmitting the request to the second server, together with the second encrypted version of the password and a request to migrate the user to the second server.

20 Claims, 5 Drawing Sheets

METHOD AND SYSTEM FOR SECURE PASSWORD MIGRATION BETWEEN AUTHENTICATION SERVERS

CROSS-REFERENCE TO RELATED APPLICATIONS

This application claims priority benefit from Indian Application No. 202411049256, filed on Jun. 27, 2024 in the India Patent Office, which is hereby incorporated by reference in its entirety.

BACKGROUND

1. Field of the Disclosure

This technology generally relates to methods and systems for securely performing a password migration, and more particularly to methods and systems for securely performing a password migration between authentication servers where the password is end-to-end encrypted and hashed.

2. Background Information

In many computer systems, passwords are used as one mechanism for authenticating a user as being a permissible and legitimate user, in order to prevent would-be bad actors from obtaining access to such a system. In some situations, there is a need to migrate from one authentication server to another. However, such a migration inherently raises a risk of compromising the password, and therefore, various strategies may be used to protect the confidentiality of the password.

In this type of scenario, an existing authentication server A may store a password in an end-to-end fully encrypted format. When a user creates a password, the server may keep the password encrypted, for example, by using a customized hardware security manager (HSM) solution that is not accessible outside of the authentication service. Typically, in this type of situation, the encrypted password may also be subject to a further process of hashing with salt in order to prevent an inside attack, i.e., a breaking of the password by a trusted person that has access to the encrypted password. When the user inputs the password, an encrypted public key from server A is used for encrypting the password, e.g., in a browser, and transferring the encrypted password from the browser in order to safely transfer the password to the authentication server and thereby to prevent a man-in-the-middle attack.

In the scenario where the authentication server A is being replaced or upgraded to a new authentication server B, the new authentication server B will not understand the encryption and/or the hash-plus-salting logic used in the authentication server A. In general, authentication server B likely uses a completely different propriety method for protecting passwords. As a result, there is no direct way to migrate an existing password from server A to server B.

Accordingly, there is a need for a mechanism for securely performing a password migration between authentication servers where the password is end-to-end encrypted and hashed, without causing user friction.

SUMMARY

The present disclosure, through one or more of its various aspects, embodiments, and/or specific features or sub-components, provides, inter alia, various systems, servers, devices, methods, media, programs, and platforms for securely performing a password migration between authentication servers where the password is end-to-end encrypted and hashed.

According to an aspect of the present disclosure, a method for securely performing a password migration between authentication servers is provided. The method is implemented by at least one processor. The method includes: receiving, by the at least one processor from a user, a first authentication initiation request; transmitting, by the at least one processor to a first server, the first authentication initiation request; after the user has received a first public key and a first set of authentication parameters from the first server, receiving, by the at least one processor from the user, a second authentication initiation request; transmitting, by at least one processor to a second server, the second authentication initiation request; after the user has received a second public key and a second set of authentication parameters from the second server, and after the user has entered a username and a password and has stored, in a memory, a first encrypted version of the password that is encrypted by using the first public key and a second encrypted version of the password that is encrypted by using the second public key, receiving, by the at least one processor from the user, a request to perform an authentication of the user with the first server based on the first encrypted version of the password; transmitting, by the at least one processor to the first server, the request to perform the authentication of the user with the first server; after the authentication of the user has been completed and a token has been issued by the first server to the user, receiving, by the at least one processor from the user, a request to update the password in the second server based on the token; transmitting, by the at least one processor to the first server, a request to validate the token; receiving, by the at least one processor from the first server, a validation of the token; and transmitting, by the at least one processor to the second server, the request to update the password in the second server, together with the second encrypted version of the password and a request to migrate the user to the second server.

The method may further include: after the user has been successfully migrated to the second server, receiving, from the user, a request to perform an authentication of the user with the second server based on the second encrypted version of the password; transmitting, to the second server, the request to perform the authentication of the user with the second server; and receiving, from the second server, a message indicating that the authentication of the user has been completed.

Each of the first encrypted version of the password and the second encrypted version of the password may include a respective end-to-end fully encrypted version of the password.

The first server may store the first encrypted version of the password and an additional version of the password that is generated by applying a predetermined hash algorithm to the first encrypted version of the password.

The predetermined hash algorithm may include salting logic that adds randomness to an output of the predetermined hash algorithm.

The authentication of the user may include a multi-factor authentication that requires at least one additional information exchange between the user and the first server.

When the user receives the first public key and the first set of authentication parameters from the first server via a first user device, the additional information exchange between the user and the first server may include a communication between the user and the first server via a second user device that is different from the first user device.

The first server may use a first proprietary scheme for protecting the password. The second server may use a second proprietary scheme for protecting the password that is different from the first proprietary scheme.

According to another exemplary embodiment, a computing apparatus for securely performing a password migration between authentication servers is provided. The computing apparatus includes a processor; a memory; and a communication interface coupled to each of the processor and the memory. The processor is configured to: receive, via the communication interface from a user, a first authentication initiation request; transmit, via the communication interface to a first server, the first authentication initiation request; after the user has received a first public key and a first set of authentication parameters from the first server, receive, via the communication interface from the user, a second authentication initiation request; transmit, via the communication interface to a second server, the second authentication initiation request; after the user has received a second public key and a second set of authentication parameters from the second server, and after the user has entered a username and a password and has stored, in the memory, a first encrypted version of the password that is encrypted by using the first public key and a second encrypted version of the password that is encrypted by using the second public key, receive, via the communication interface from the user, a request to perform an authentication of the user with the first server based on the first encrypted version of the password; transmit, via the communication interface to the first server, the request to perform the authentication of the user with the first server; after the authentication of the user has been completed and a token has been issued by the first server to the user, receive, via the communication interface from the user, a request to update the password in the second server based on the token; transmit, via the communication interface to the first server, a request to validate the token; receive, via the communication interface from the first server, a validation of the token; and transmit, via the communication interface to the second server, the request to update the password in the second server, together with the second encrypted version of the password and a request to migrate the user to the second server.

The processor may be further configured to: after the user has been successfully migrated to the second server, receive, via the communication interface from the user, a request to perform an authentication of the user with the second server based on the second encrypted version of the password; transmit, via the communication interface to the second server, the request to perform the authentication of the user with the second server; and receive, via the communication interface from the second server, a message indicating that the authentication of the user has been completed.

Each of the first encrypted version of the password and the second encrypted version of the password may include a respective end-to-end fully encrypted version of the password.

The first server may store the first encrypted version of the password and an additional version of the password that is generated by applying a predetermined hash algorithm to the first encrypted version of the password.

The predetermined hash algorithm may include salting logic that adds randomness to an output of the predetermined hash algorithm.

The authentication of the user may include a multi-factor authentication that requires at least one additional information exchange between the user and the first server.

When the user receives the first public key and the first set of authentication parameters from the first server via a first user device, the additional information exchange between the user and the first server may include a communication between the user and the first server via a second user device that is different from the first user device.

The first server may use a first proprietary scheme for protecting the password, and the second server may use a second proprietary scheme for protecting the password that is different from the first proprietary scheme.

According to yet another exemplary embodiment, a non-transitory computer readable storage medium storing instructions for securely performing a password migration between authentication servers is provided. The storage medium includes executable code which, when executed by a processor, causes the processor to: receive, from a user, a first authentication initiation request; transmit, to a first server, the first authentication initiation request; after the user has received a first public key and a first set of authentication parameters from the first server, receive, from the user, a second authentication initiation request; transmit, to a second server, the second authentication initiation request; after the user has received a second public key and a second set of authentication parameters from the second server, and after the user has entered a username and a password and has stored, in a memory, a first encrypted version of the password that is encrypted by using the first public key and a second encrypted version of the password that is encrypted by using the second public key, receive, from the user, a request to perform an authentication of the user with the first server based on the first encrypted version of the password; transmit, to the first server, the request to perform the authentication of the user with the first server; after the authentication of the user has been completed and a token has been issued by the first server to the user, receive, from the user, a request to update the password in the second server based on the token; transmit, to the first server, a request to validate the token; receive, from the first server, a validation of the token; and transmit, to the second server, the request to update the password in the second server, together with the second encrypted version of the password and a request to migrate the user to the second server.

When executed, the executable code may further cause the processor to: after the user has been successfully migrated to the second server, receive, from the user, a request to perform an authentication of the user with the second server based on the second encrypted version of the password; transmit, to the second server, the request to perform the authentication of the user with the second server; and receive, from the second server, a message indicating that the authentication of the user has been completed.

Each of the first encrypted version of the password and the second encrypted version of the password may include a respective end-to-end fully encrypted version of the password.

The first server may store the first encrypted version of the password and an additional version of the password that is generated by applying a predetermined hash algorithm to the first encrypted version of the password.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
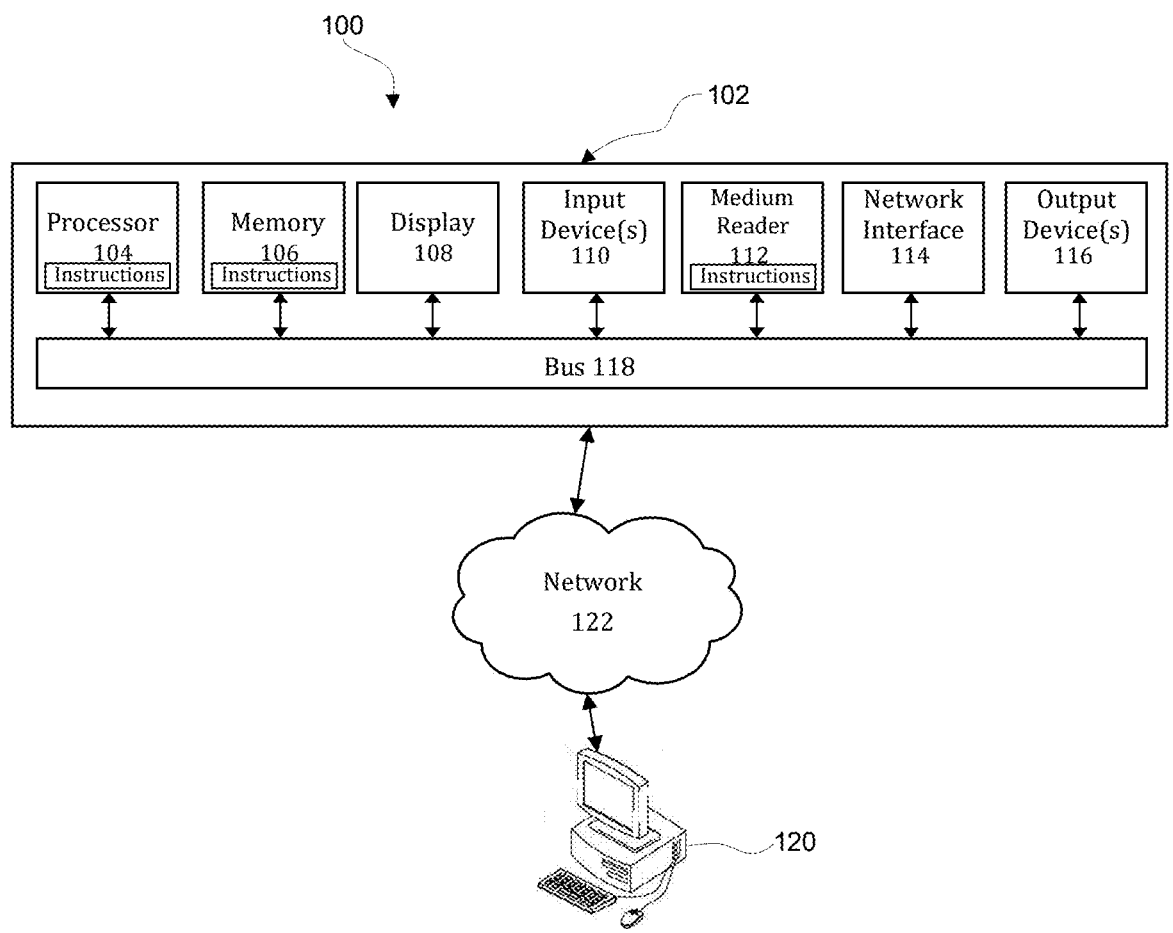
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for securely performing a password migration between authentication servers where the password is end-to-end encrypted and hashed.

Figure 2:
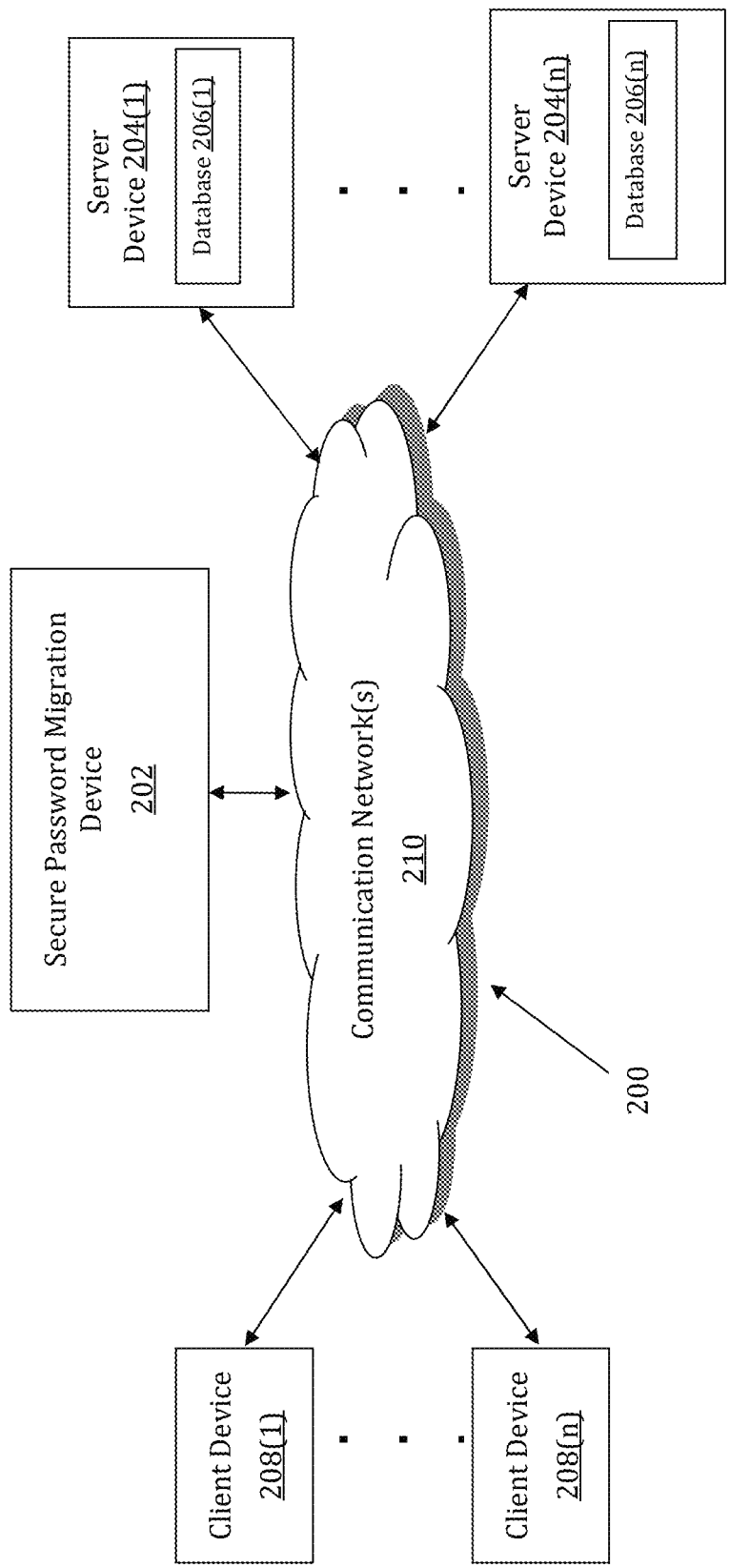
FIG. 2 illustrates an exemplary diagram of a network environment.

Referring to FIG. 2, a schematic of an exemplary network environment 200 for implementing a method for securely performing a password migration between authentication servers where the password is end-to-end encrypted and hashed is illustrated. In an exemplary embodiment, the method is executable on any networked computer platform, such as, for example, a personal computer (PC).

The method for securely performing a password migration between authentication servers where the password is end-to-end encrypted and hashed may be implemented by a Secure Password Migration (SPM) device 202. The SPM device 202 may be the same or similar to the computer system 102 as described with respect to FIG. 1. The SPM device 202 may store one or more applications that can include executable instructions that, when executed by the SPM device 202, cause the SPM device 202 to perform actions, such as to transmit, receive, or otherwise process network messages, for example, and to perform other actions described and illustrated below with reference to the figures. The application(s) may be implemented as modules or components of other applications. Further, the application (s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SPM device 202 itself, may be located in virtual server(s) running in a cloud-based computing environment rather than being tied to one or more specific physical network computing devices. Also, the application(s) may be running in one or more virtual machines (VMs) executing on the SPM device 202. Additionally, in one or more embodiments of this technology, virtual machine(s) running on the SPM device 202 may be managed or supervised by a hypervisor.

In the network environment 200 of FIG. 2, the SPM device 202 is coupled to a plurality of server devices 204(1)-204(n) that hosts a plurality of databases 206(1)-206(n), and also to a plurality of client devices 208(1)-208(n) via communication network(s) 210. A communication interface of the SPM device 202, such as the network interface 114 of the computer system 102 of FIG. 1, operatively couples and communicates between the SPM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SPM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and SPM devices that efficiently implement a method for securely performing a password migration between authentication servers where the password is end-to-end encrypted and hashed.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SPM device 202 may be a standalone device or integrated with one or more other devices or apparatuses, such as one or more of the server devices 204(1)-204(n), for example. In one particular example, the SPM device 202 may include or be hosted by one of the server devices 204(1)-204(n), and other arrangements are also possible. Moreover, one or more of the devices of the SPM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SPM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store various types of information.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the SPM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the SPM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the SPM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SPM device 202, the server devices 204(1)-204(n), or the client devices 208(1)-208(n), for example, may be configured to operate as virtual instances on the same physical machine. In other words, one or more of the SPM device 202, the server devices 204(1)-204(n), or the client devices 208(1)-208(n) may operate on the same physical device rather than as separate devices communicating through communication network(s) 210. Additionally, there may be more or fewer SPM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
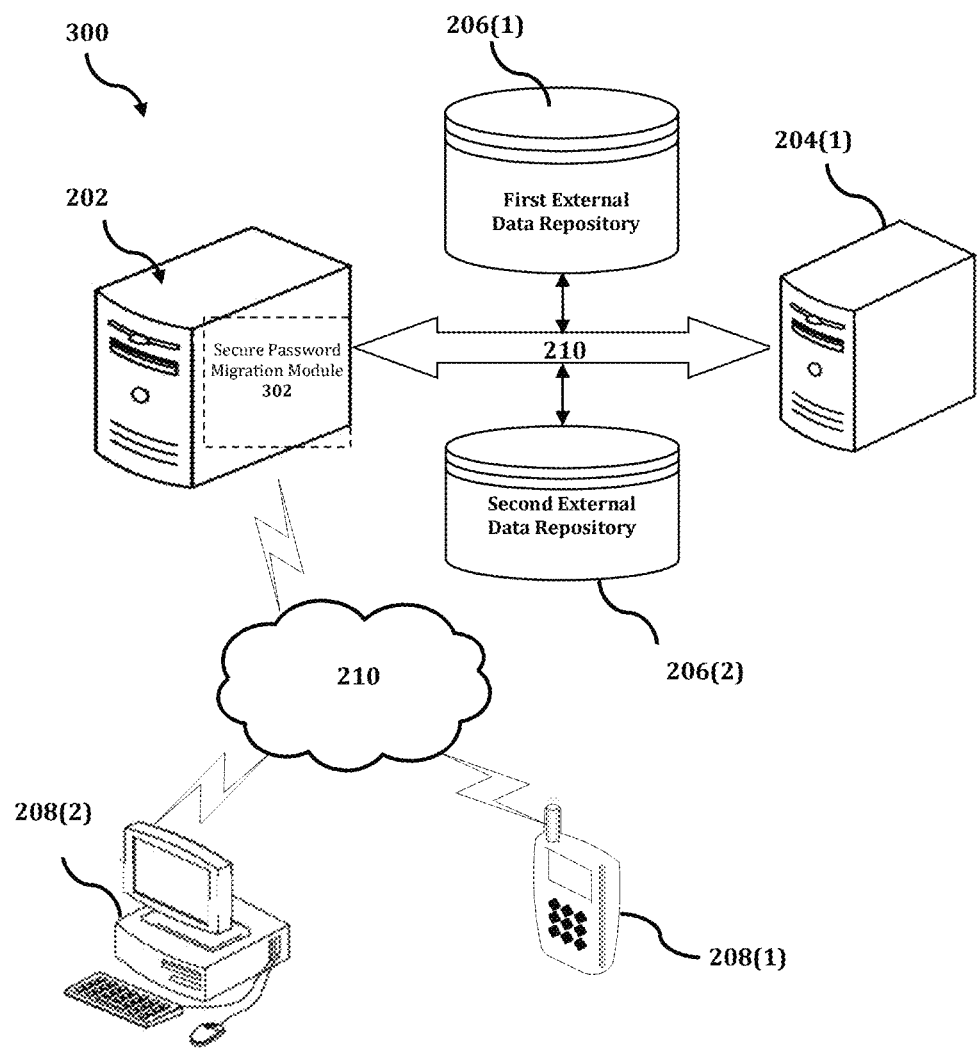
FIG. 3 shows an exemplary system for implementing a method for securely performing a password migration between authentication servers where the password is end-to-end encrypted and hashed.

The SPM device 202 is described and illustrated in FIG. 3 as including a secure password migration module 302, although it may include other rules, policies, modules, databases, or applications, for example. As will be described below, the secure password migration module 302 is configured to implement a method for securely performing a password migration between authentication servers where the password is end-to-end encrypted and hashed.

An exemplary process 300 for implementing a mechanism for securely performing a password migration between authentication servers where the password is end-to-end encrypted and hashed by utilizing the network environment of FIG. 2 is illustrated as being executed in FIG. 3. Specifically, a first client device 208(1) and a second client device 208(2) are illustrated as being in communication with SPM device 202. In this regard, the first client device 208(1) and the second client device 208(2) may be "clients" of the SPM device 202 and are described herein as such. Nevertheless, it is to be known and understood that the first client device 208(1) and/or the second client device 208(2) need not necessarily be "clients" of the SPM device 202, or any entity described in association therewith herein. Any additional or alternative relationship may exist between either or both of the first client device 208(1) and the second client device 208(2) and the SPM device 202, or no relationship may exist.

Further, SPM device 202 is illustrated as being able to access a first external data repository 206(1) and a second external data repository 206(2). The secure password migration module 302 may be configured to access these databases for implementing a method for securely performing a password migration between authentication servers where the password is end-to-end encrypted and hashed.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the SPM device 202 via broadband or cellular communication. Of course, these embodiments are merely exemplary and are not limiting or exhaustive.

Upon being started, the secure password migration module 302 executes a process for securely performing a password migration between authentication servers where the password is end-to-end encrypted and hashed. An exemplary process for securely performing a password migration between authentication servers where the password is end-to-end encrypted and hashed is generally indicated at flowchart 400 in FIG. 4.

Figure 4:
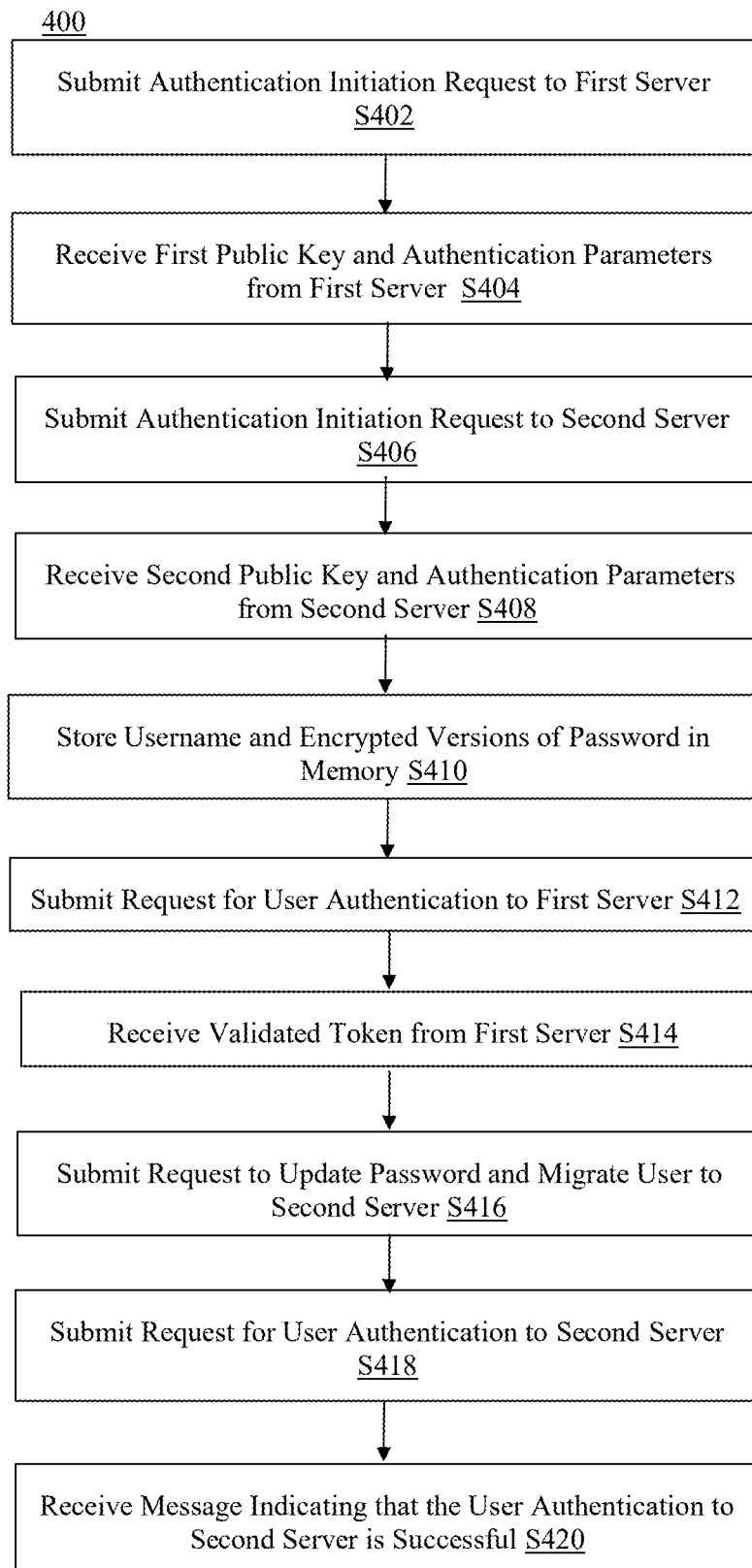
FIG. 4 is a flowchart of an exemplary process for implementing a method for securely performing a password migration between authentication servers where the password is end-to-end encrypted and hashed.

In process 400 of FIG. 4, at step S402, upon receiving a request to initiate an authentication from a user, the secure password migration module 302 submits the request to initiate the authentication to a first authentication server. Then, at step S404, the secure password migration module 302 receives a first public key and a first set of authentication parameters from the first authentication server.

At step S406, the secure password migration module 302 submits another request to initiate an authentication of the user to a second authentication server. Then, at step S408, the secure password migration module 302 receives a second public key and a second set of authentication parameters from the second authentication server. In an exemplary embodiment, the first authentication server uses a first proprietary scheme for protecting passwords, and the second authentication server uses a second proprietary password-protection scheme that is different from the first proprietary scheme.

At step S410, the secure password migration module 302 stores a username and a password that are associated with the user in a memory and/or browser. Further, the secure password migration module 302 also stores encrypted versions of the password that are respectively generated by using the first and second public keys provided by the two authentication servers.

At step S412, the secure password migration module 302 submits a request to authenticate the user to the first authentication server. The request includes the username and the encrypted version of the password that is generated by using the first public key. In an exemplary embodiment, this encrypted version of the password is in an end-to-end fully encrypted format. The first authentication server has the ability to decrypt the encrypted password, and can then apply a predetermined hash algorithm to the password in order to provide additional security. The predetermined hash algorithm may include salting logic that adds randomness to an output of the hash algorithm, and then it can use the generated value to match with the username and password which is stored as encrypted salted hash to confirm that the user is an authentic user.

In an exemplary embodiment, it is also possible to perform a multi-factor authentication by which an additional information exchange is performed between the user and the first authentication server. For the multi-factor authentication, in some embodiments, when the other information exchanges between the user and the first authentication server are performed via a first user device, the additional information exchange may be performed via a second user device that is different from the first user device.

After the first authentication server completes the authentication of the user, the user receives a token from the first authentication server, and the user then submits a request for a user authentication to be performed with the second authentication server by providing the token. At step S414, the secure password migration module 302 requests that the first authentication server validate the token, and then receives the validated token in response to this request. Then, at step S416, the secure password migration module 302 submits the request to update the password to the second authentication server, together with a request to migrate the user to the second authentication server. Based on the validated token and the encrypted version of the password that is generated by using the second public key, the second authentication server is then able to update the password and migrate the user in response to the request.

At step S418, the secure password migration module 302 transmits a request to obtain a user authentication to the second authentication server. As a result of the successful updating of the password and the migration of the user, the second authentication server is able to provide this user authentication, and then, at step S420, the secure password migration module 302 receives a message indicating that the user authentication to the second authentication server is successful.

In an exemplary embodiment, an objective of the present inventive concept is to migrate users, including passwords from Authentication Server A to Authentication Server B, without causing user frictions and also while ensuring that the passwords are not compromised.

In an exemplary embodiment, this objective is satisfied by the following procedure: 1) When a user logs in into a system for the first time after enabling Server B, obtain the public keys for Server A and Server B and store these public keys in the client browser. 2) Encrypt the password for Server A and Server B and keep encrypted passwords for both Server A and Server B in memory in the browser. 3) Complete a multi-factor authentication ceremony with Server A and obtain an authentication token. 4) Once the user is successfully validated using Server A, it becomes possible to confidently migrate the user password, i.e., the version of the password that is encrypted with the public key from Server B, to Server B. In an exemplary embodiment, a gateway and/or proxy is used to perform the Authentication Server A token validation and the migration of the passwords into Server B. Then, on the next occasion that the user submits a request to log in via the gateway, the gateway directly sends the user to Server B for the authentication ceremony.

Reusability: In an exemplary embodiment, the above-described procedure may be used for a migration of a password between any two authentication servers. In particular, the procedure is suitable for the case of fully end-to-end encrypted and salted hashed passwords, but the procedure is also suitable for normal hashed passwords.

Figure 5:
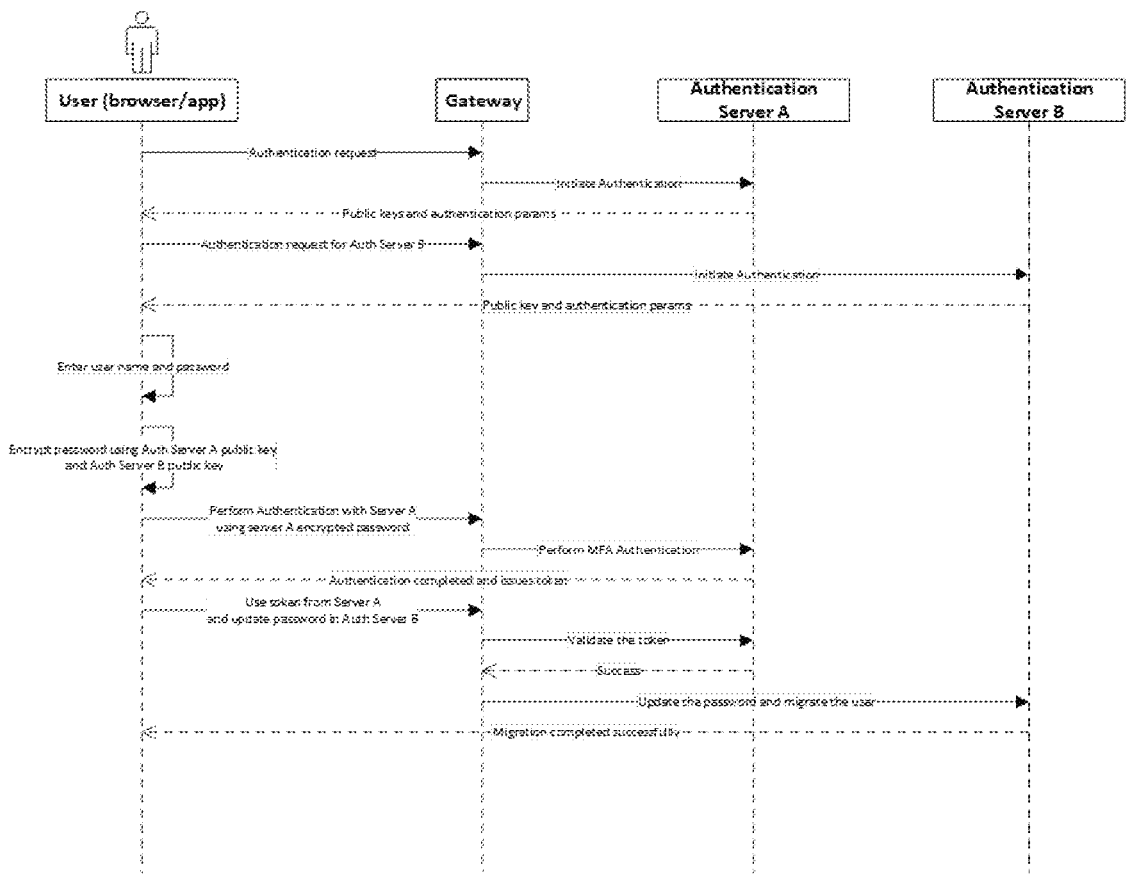
FIG. 5 is a workflow diagram of a process for securely performing a password migration between authentication servers where the password is end-to-end encrypted and hashed, according to an exemplary embodiment.

FIG. 5 is a workflow diagram 500 of a process for securely performing a password migration between authentication servers where the password is end-to-end encrypted and hashed, according to an exemplary embodiment. As illustrated in FIG. 5, the process begins when a user, via a browser, transmits an authentication request to a gateway component. The gateway then submits an authentication initiation request to a first authentication server, shown as Authentication Server A. Server A then transmits a first public key and a first set of authentication parameters to the user's browser.

Referring again to FIG. 5, the process continues when the user transmits an authentication request for a second authentication server, shown as Authentication Server B, to the gateway. The gateway then submits an authentication initiation request to Server B. Server B then transmits a second public key and a second set of authentication parameters to the user's browser. The user then enters a username-and-password combination for storage in the browser, and encrypted versions of the password are generated by using both the first public key and the second public key.

Referring again to FIG. 5, the process continues when the user transmits a request to obtain a user authentication from Server A to the gateway. The gateway then asks Server A to perform a multi-factor authentication. When this authentication is complete, Server A issues a token to the user to indicate a successful user authentication. The user then transmits the token to the gateway with a request to update the password in Server B. The gateway asks Server A to validate the token, and upon receiving an indication that the token is valid, the gateway then submits a request to Server B to update the password and migrate the user. Lastly, Server B transmits a message to the user to indicate that the migration has been successfully completed, thereby enabling the user to perform subsequent user authentications directly with Server B.

Accordingly, with this technology, an optimized process for securely performing a password migration between authentication servers where the password is end-to-end encrypted and hashed is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for securely performing a password migration between authentication servers, the method being implemented by at least one processor, the method comprising:
   receiving, by the at least one processor from a user, a first authentication initiation request;
   transmitting, by the at least one processor to a first server, the first authentication initiation request;
   after the user has received a first public key and a first set of authentication parameters from the first server, receiving, by the at least one processor from the user, a second authentication initiation request;
   transmitting, by at least one processor to a second server, the second authentication initiation request;
   after the user has received a second public key and a second set of authentication parameters from the second server, and after the user has entered a username and a password and has stored, in a memory, a first encrypted version of the password that is encrypted by using the first public key and a second encrypted version of the password that is encrypted by using the second public key, receiving, by the at least one processor from the user, a request to perform an authentication of the user with the first server based on the first encrypted version of the password;
   transmitting, by the at least one processor to the first server, the request to perform the authentication of the user with the first server;
   after the authentication of the user has been completed and a token has been issued by the first server to the user, receiving, by the at least one processor from the user, a request to update the password in the second server based on the token;
   transmitting, by the at least one processor to the first server, a request to validate the token;
   receiving, by the at least one processor from the first server, a validation of the token; and
   transmitting, by the at least one processor to the second server, the request to update the password in the second server, together with the second encrypted version of the password and a request to migrate the user to the second server.

2. The method of claim 1, further comprising:
   after the user has been successfully migrated to the second server, receiving, from the user, a request to perform an authentication of the user with the second server based on the second encrypted version of the password;
   transmitting, to the second server, the request to perform the authentication of the user with the second server; and
   receiving, from the second server, a message indicating that the authentication of the user has been completed.

3. The method of claim 1, wherein each of the first encrypted version of the password and the second encrypted version of the password comprises a respective end-to-end fully encrypted version of the password.

4. The method of claim 3, wherein the first server stores the first encrypted version of the password and an additional version of the password that is generated by applying a predetermined hash algorithm to the first encrypted version of the password.

5. The method of claim 4, wherein the predetermined hash algorithm includes salting logic that adds randomness to an output of the predetermined hash algorithm.

6. The method of claim 1, wherein the authentication of the user comprises a multi-factor authentication that requires at least one additional information exchange between the user and the first server.

7. The method of claim 1, wherein the first server uses a first proprietary scheme for protecting the password, and the second server uses a second proprietary scheme for protecting the password that is different from the first proprietary scheme.

8. A computing apparatus for securely performing a password migration between authentication servers, the computing apparatus comprising:
   a processor;
   a memory; and
   a communication interface coupled to each of the processor and the memory, wherein the processor is configured to:
      receive, via the communication interface from a user, a first authentication initiation request;
      transmit, via the communication interface to a first server, the first authentication initiation request;
      after the user has received a first public key and a first set of authentication parameters from the first server, receive, via the communication interface from the user, a second authentication initiation request;
      transmit, via the communication interface to a second server, the second authentication initiation request;
      after the user has received a second public key and a second set of authentication parameters from the second server, and after the user has entered a username and a password and has stored, in the memory, a first encrypted version of the password that is encrypted by using the first public key and a second encrypted version of the password that is encrypted by using the second public key, receive, via the communication interface from the user, a request to perform an authentication of the user with the first server based on the first encrypted version of the password;
      transmit, via the communication interface to the first server, the request to perform the authentication of the user with the first server;
      after the authentication of the user has been completed and a token has been issued by the first server to the user, receive, via the communication interface from the user, a request to update the password in the second server based on the token;
      transmit, via the communication interface to the first server, a request to validate the token;
      receive, via the communication interface from the first server, a validation of the token; and
      transmit, via the communication interface to the second server, the request to update the password in the second server, together with the second encrypted version of the password and a request to migrate the user to the second server.

9. The computing apparatus of claim 8, wherein the processor is further configured to:
   after the user has been successfully migrated to the second server, receive, via the communication interface from the user, a request to perform an authentication of the user with the second server based on the second encrypted version of the password;
   transmit, via the communication interface to the second server, the request to perform the authentication of the user with the second server; and
   receive, via the communication interface from the second server, a message indicating that the authentication of the user has been completed.

10. The computing apparatus of claim 8, wherein each of the first encrypted version of the password and the second encrypted version of the password comprises a respective end-to-end fully encrypted version of the password.

11. The computing apparatus of claim 10, wherein the first server stores the first encrypted version of the password and an additional version of the password that is generated by applying a predetermined hash algorithm to the first encrypted version of the password.

12. The computing apparatus of claim 11, wherein the predetermined hash algorithm includes salting logic that adds randomness to an output of the predetermined hash algorithm.

13. The computing apparatus of claim 8, wherein the authentication of the user comprises a multi-factor authentication that requires at least one additional information exchange between the user and the first server.

14. The computing apparatus of claim 8, wherein the first server uses a first proprietary scheme for protecting the password, and the second server uses a second proprietary scheme for protecting the password that is different from the first proprietary scheme.

15. A non-transitory computer readable storage medium storing instructions for securely performing a password migration between authentication servers, the storage medium comprising executable code which, when executed by a processor, causes the processor to:
   receive, from a user, a first authentication initiation request;
   transmit, to a first server, the first authentication initiation request;
   after the user has received a first public key and a first set of authentication parameters from the first server, receive, from the user, a second authentication initiation request;
   transmit, to a second server, the second authentication initiation request;
   after the user has received a second public key and a second set of authentication parameters from the second server, and after the user has entered a username and a password and has stored, in a memory, a first encrypted version of the password that is encrypted by using the first public key and a second encrypted version of the password that is encrypted by using the second public key, receive, from the user, a request to perform an authentication of the user with the first server based on the first encrypted version of the password;
   transmit, to the first server, the request to perform the authentication of the user with the first server;
   after the authentication of the user has been completed and a token has been issued by the first server to the user, receive, from the user, a request to update the password in the second server based on the token;
   transmit, to the first server, a request to validate the token;
   receive, from the first server, a validation of the token; and
   transmit, to the second server, the request to update the password in the second server, together with the second encrypted version of the password and a request to migrate the user to the second server.

16. The storage medium of claim 15, wherein when executed, the executable code further causes the processor to:
- after the user has been successfully migrated to the second server, receive, from the user, a request to perform an authentication of the user with the second server based on the second encrypted version of the password;
- transmit, to the second server, the request to perform the authentication of the user with the second server; and
- receive, from the second server, a message indicating that the authentication of the user has been completed.

17. The storage medium of claim 15, wherein each of the first encrypted version of the password and the second encrypted version of the password comprises a respective end-to-end fully encrypted version of the password.

18. The storage medium of claim 17, wherein the first server stores the first encrypted version of the password and an additional version of the password that is generated by applying a predetermined hash algorithm to the first encrypted version of the password.

19. The storage medium of claim 18, wherein the predetermined hash algorithm includes salting logic that adds randomness to an output of the predetermined hash algorithm.

20. The storage medium of claim 15, wherein the authentication of the user comprises a multi-factor authentication that requires at least one additional information exchange between the user and the first server.

\* \* \* \* \*